US012695202B2

(12) United States Patent
Sharma et al.

(10) Patent No.: US 12,695,202 B2
(45) Date of Patent: Jul. 28, 2026

(54) WIDEBAND DUAL-MODE ANTENNA

(71) Applicant: United States of America as represented by the Secretary of the Navy, San Diego, CA (US)

(72) Inventors: Satish Kumar Sharma, San Diego, CA (US); Jia-Chi Samuel Chieh, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 246 days.

(21) Appl. No.: 18/388,341

(22) Filed: Nov. 9, 2023

(65) Prior Publication Data

US 2025/0158288 A1 May 15, 2025

(51) Int. Cl.
*H01Q 25/00* (2006.01)
*H01Q 13/08* (2006.01)
*H01Q 13/10* (2006.01)
*H01Q 21/24* (2006.01)

(52) U.S. Cl.
CPC ......... *H01Q 13/106* (2013.01); *H01Q 13/085* (2013.01); *H01Q 21/24* (2013.01); *H01Q 25/002* (2013.01)

(58) Field of Classification Search
CPC .... H01Q 13/085; H01Q 21/24; H01Q 25/002; H01Q 13/106; H01Q 21/064; H01Q 1/38; H01Q 13/08–10
See application file for complete search history.

(56) References Cited

U.S. PATENT DOCUMENTS 7,138,947 B2 * 11/2006 Fisher .................... H01Q 13/08 343/700 MS
11,855,345 B2 * 12/2023 Gunnels ............... H01Q 13/085

FOREIGN PATENT DOCUMENTS

CN 105576380 A * 5/2016 ........... H01Q 13/106
CN 211045722 U * 7/2020
CN 111555025 A * 8/2020 ............... H01Q 1/50

OTHER PUBLICATIONS

CN-111555025-A (Year: 2020).*
CN-105576380-A Translation (Year: 2016).*
CN-111555025-A Translation (Year: 2020).*
CN-211045722-U Translation (Year: 2020).*
Wideband Phased Array Antenna with Grating Lobe Cancellation—Jia-Chi Samuel Chieh et al.—Naval Information Warfare Center Pacific Advanced Integrated Circuits Technology Branch—Feb. 16, 2022 (Year: 2022).*

(Continued)

*Primary Examiner* — Alexander H Taningco
*Assistant Examiner* — Gurbir Singh
(74) *Attorney, Agent, or Firm* — Naval Information Warfare Center Pacific; Kyle Eppele

(57) ABSTRACT

A wideband dual-mode antenna comprising: a dielectric substrate; a conductive layer disposed on a first face of the dielectric substrate; two tapered slots separated from each other by a linear center conductor formed in the conductive layer, wherein the tapered slots narrow to slot-lines terminated by respective baluns at a feed end of the wideband dual-mode antenna; and wherein the two slot-lines follow paths that, at the feed end, transition from being parallel to the center conductor to following meandering paths that curve away from, and then back towards, the center conductor.

14 Claims, 9 Drawing Sheets

(56) References Cited

OTHER PUBLICATIONS

Jia-Chi Samuel Chieh, Sanghamitro Das, and Satish K. Sharma; "A Wideband Phased Array Antenna with Grating Lobe Cancellation" presented at the 2021 IEEE International Symposium on Antennas and Propagation and USNC-URSI Radio Science Meeting; 2021.

* cited by examiner

WIDEBAND DUAL-MODE ANTENNA

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 210785.

BACKGROUND OF THE INVENTION

It is desirable to reduce an antenna's sidelobe or grating lobe nulling. Typical phased array antennas utilize a single radiating mode, and in order to reduce the sidelobes, apply phase tapers or adjust the amplitude. There is a limit to how much nulling can be achieved through the use of tapers. There is a need for an improved antenna with reduced sidelobe and grating lobe nulling.

SUMMARY

Disclosed herein is a wideband dual-mode antenna comprising a dielectric substrate and a conductive layer. The conductive layer is disposed on a first face of the dielectric substrate. Two tapered slots are formed in the conductive layer and are separated from each other by a linear center conductor also formed in the conductive layer. The tapered slots narrow to slot-lines terminated by respective baluns at a feed end of the wideband dual-mode antenna. The two slot-lines follow paths that, at the feed end, transition from being parallel to the center conductor to following meandering paths that curve away from, and then back towards, the center conductor.

An embodiment of the wideband dual-mode antenna is disclosed herein as comprising a dielectric substrate, a conductive layer, two micro-strip conductors, and a conductive isolation boundary. The dielectric substrate has first and second faces that are opposite to each other. The conductive layer is disposed on the first face and two tapered slots are formed in the conductive layer. Each tapered slot tapers from a mouth at an aperture end to a slot-line at a feed end. A center conductor is also formed in the conductive layer separating the two tapered slots. The micro-strip conductors are disposed on the second face so as to feed the two tapered slots to form tapered slot antennas. The conductive isolation boundary is disposed on the second face opposite the center conductor and electrically connected to the center conductor through a series of vias in the dielectric substrate.

An embodiment of the wideband dual-mode antenna is disclosed herein as comprising a dielectric substrate, a conductive layer, two micro-strip conductors, and a conductive isolation boundary. The dielectric substrate has first and second faces that are opposite to each other and the conductive layer is disposed on the first face. Two tapered slots are formed in the conductive layer so that each tapered slot tapers from a mouth at an aperture end to a slot-line at a feed end. The two micro-strip conductors are disposed on the second face so as to feed the two tapered slots to form tapered slot antennas. The conductive isolation boundary is disposed on the second face so as to be between the two tapered slots and is electrically connected to the conductive layer.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed antenna below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
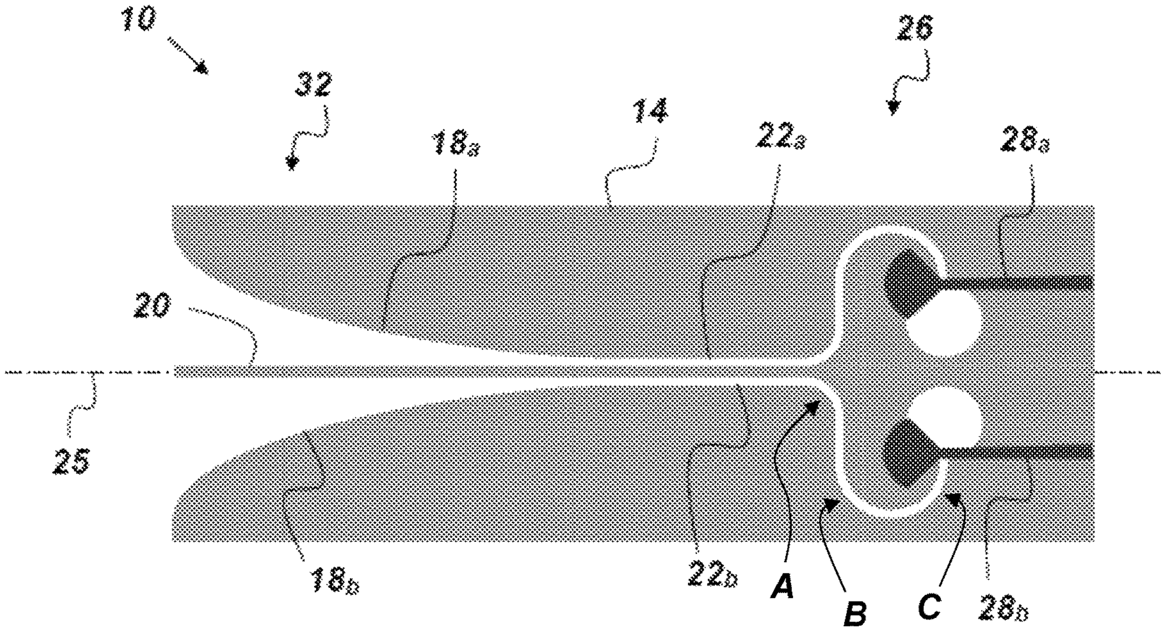
FIG. 1A is a top-view illustration of an embodiment of a wideband dual-mode antenna.
Figure 1B:
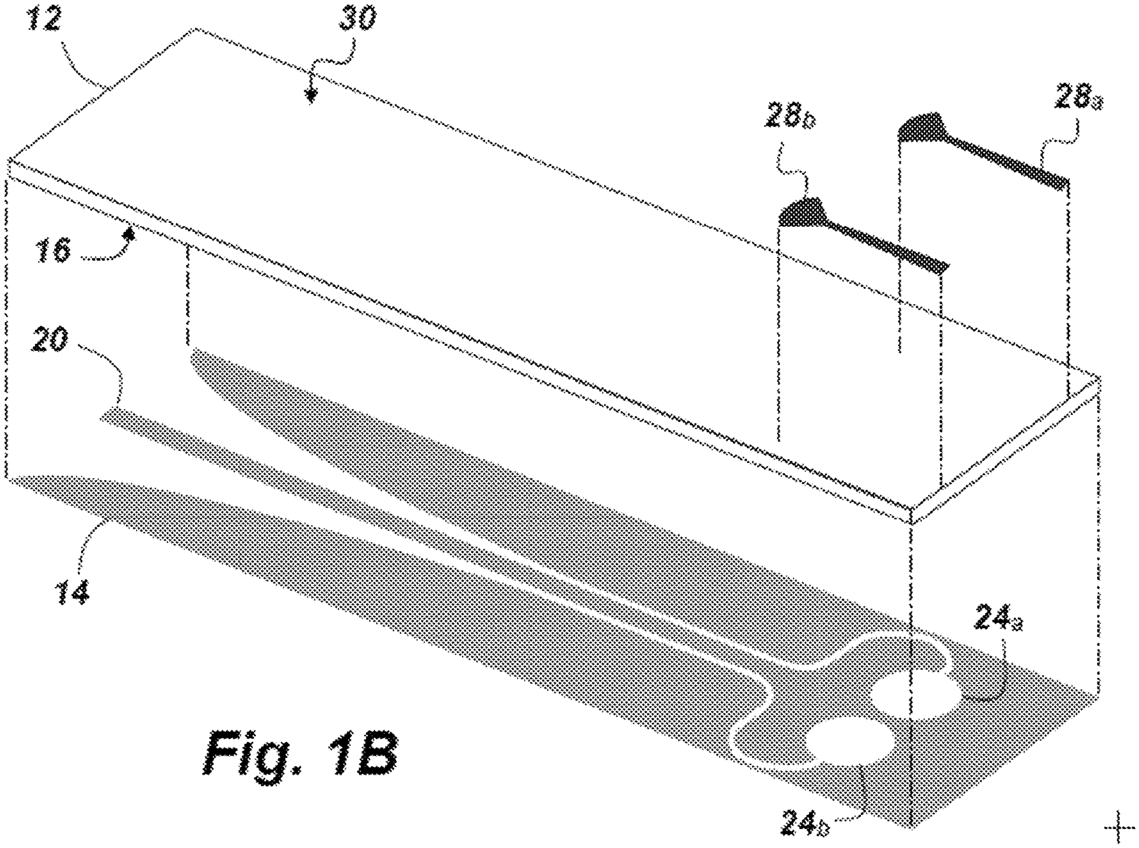
FIG. 1B is an expanded, perspective-view illustration of the embodiment of the wideband dual-mode antenna shown in FIG. 1A.

FIGS. 1A and 1B are illustrations of an embodiment of a wideband dual-mode antenna 10 that comprises, consists of, or consists essentially of a dielectric substrate 12 and a conductive layer 14. FIG. 1A is a top-view of the embodiment of the wideband dual-mode antenna 10 and FIG. 1B is an expanded, perspective-view of the embodiment. The conductive layer 14 is disposed on a first face 16 of the dielectric substrate 12. Two tapered slots **18*a* and 18*b* are formed in the conductive layer 14 such that they are separated from each other by a linear center conductor 20 that is also formed in the conductive layer 14. The center conductor may be aligned with a center line 25 of the wideband dual-mode antenna 10. The tapered slots 18*a* and 18*b* transition to slot-lines 22*a* and 22*b* that are terminated by respective baluns 24*a* and 24*b* at a feed end 26 of the wideband dual-mode antenna 10. As shown in FIGS. 1A and 1B, in this embodiment of the wideband, dual-mode antenna 10, the two slot-lines 22***a* and 22*b* follow paths that, at the feed end 26, transition from being parallel to the center conductor 20 to following meandering paths that curve away from, and then back towards, the center conductor 20. In FIG. 1A, the dielectric substrate 12 is transparent to facilitate viewing of the alignment of the conductive layer 14 with respect to two micro-strip conductors 28*a* and 28*b* that are disposed on a second face 30 of the dielectric substrate 12 at the feed end 26. The two micro-strip conductors 28*a* and 28*b* are configured to feed the two tapered slots 18*a* and 18*b* to form tapered slot antennas at an aperture end 32.

The wideband, dual-mode antenna 10 can support multiple radiating modes and can be used in beamforming arrays to reduce and mitigate sidelobes or grating lobes or both. FIGS. 1A and 1B illustrate a Vivaldi, or tapered slot, embodiment of the wideband, dual-mode antenna 10 that includes two transitions from two micro-strip conductors 28*a* and 28*b* to two slot-lines 22*a* and 22*b* slot-line transitions within the aperture opening of the Vivaldi antenna. The wideband, dual-mode antenna 10 may be configured to simultaneously generate a differential radiating mode and a common mode where the patterns for each of the modes are orthogonal.

Figure 2:
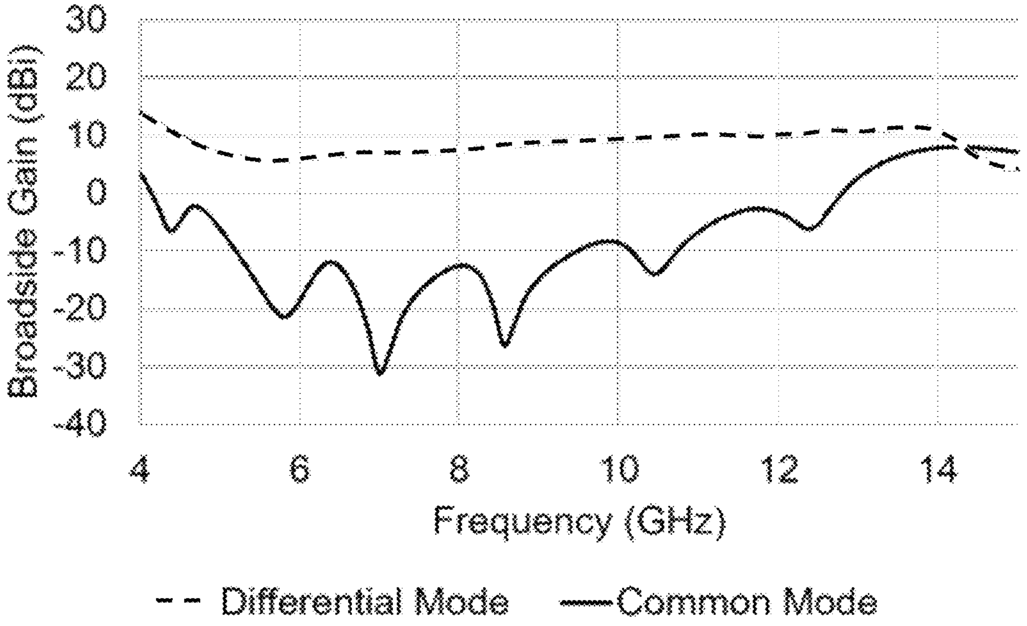
FIG. 2 is a plot of data.

FIG. 2 is a plot showing the broadside (zenith) gain versus frequency for the common and differential radiating modes of an embodiment of the wideband, dual-mode antenna 10. For the common mode, there is a destructive cosine pattern, with a null at zenith. For the differential mode, there is a constructive pattern, with a peak at zenith. As can be seen in FIG. 2, the two radiating modes are broadband and have a large separation between the modes. The larger the separation between the modes, the less interaction they'll have with each other.

Figure 3:
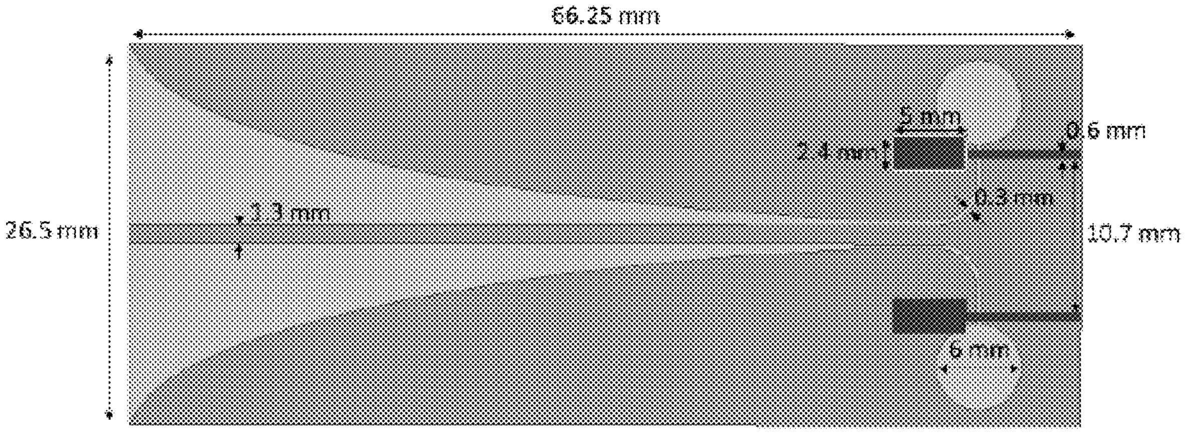
Fig. 3 (prior art)
FIG. 3 is a prior art image of a dual-mode tapered slot antenna.

FIG. 3 is a top-view illustration of a prior art example of a wideband phased array antenna with grating lobe cancellation from the paper "A Wideband Phased Array Antenna with Grating Lobe Cancellation" by Jia-Chi Samuel Chieh, Sanghamitro Das, and Satish K. Sharma, presented at the 2021 IEEE International Symposium on Antennas and Propagation and USNC-URSI Radio Science Meeting, which paper is incorporated herein by reference. For modal combination, the higher the isolation between the two modes, the better the nulling capability you can achieve for both sidelobe and grating lobe nulling. The embodiment of the wideband, dual-mode antenna 10 shown in FIGS. 1A and 1B increases the isolation between the modes beyond the isolation achieved by the prior art by meandering the slot line transition (i.e., in this case the meandering path includes three 90-degree curves) so that the two slot-lines 22*a* and 22*b* have a larger physical separation than the phased array antenna shown in FIG. 3.

Figure 4A:
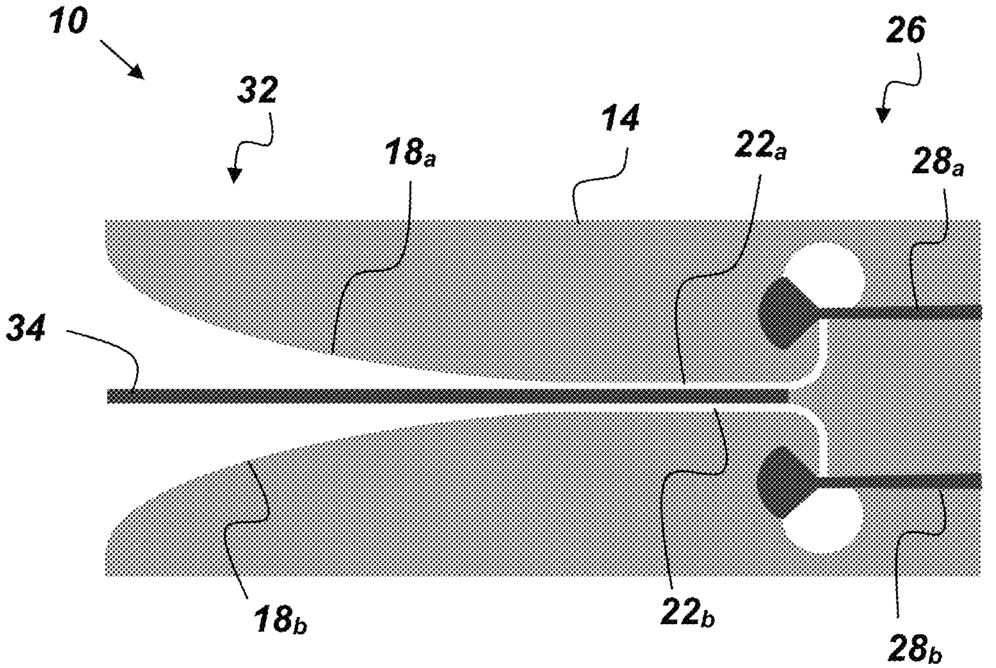
FIG. 4A is a top-view illustration of an embodiment of a wideband dual-mode antenna.
Figure 4B:
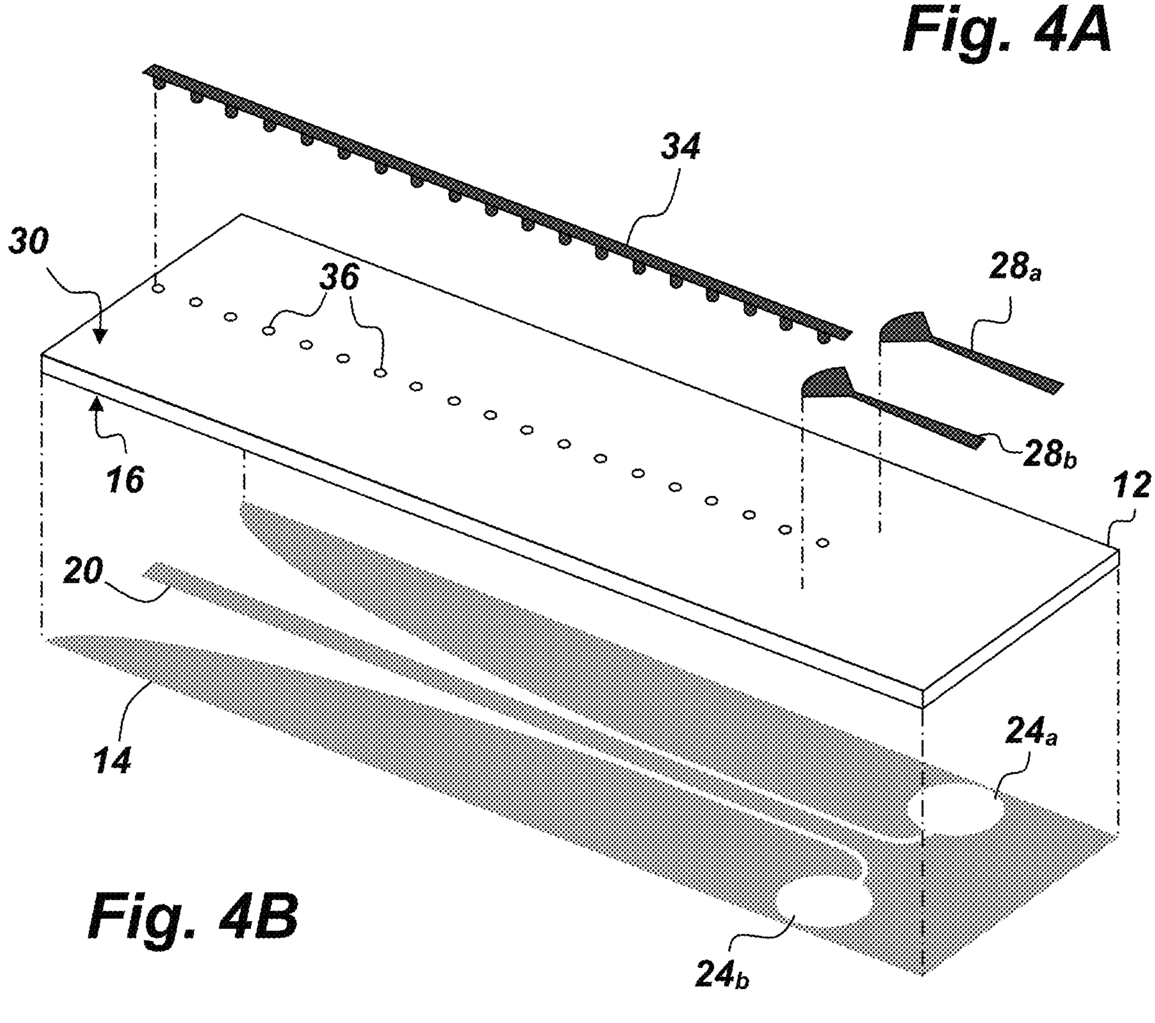
FIG. 4B is an expanded, perspective-view illustration of the embodiment of the wideband dual-mode antenna shown in FIG. 4A.

FIGS. 4A and 4B are illustrations of an embodiment of a wideband dual-mode antenna 10 that further comprises an isolation boundary 34. FIG. 4A is a top-view of the embodiment of the wideband dual-mode antenna 10 and FIG. 4B is an expanded, perspective-view of the embodiment. The isolation boundary 34 is conductive, is disposed on the second face 20 of the dielectric substrate 12, and is electrically connected to the center conductor 20. The isolation boundary 34 helps increase the isolation between the two radiating modes. In the embodiment of the wideband dual-mode antenna 10 shown in FIGS. 4A and 4B, the isolation boundary 34 has approximately the same dimensions as the center conductor 20 and is electrically connected to the center conductor 20 by a plurality of evenly-spaced vias 36 in the dielectric substrate 12 that may be filled with the same conductive material from which the isolation boundary is made.

Figure 5A:
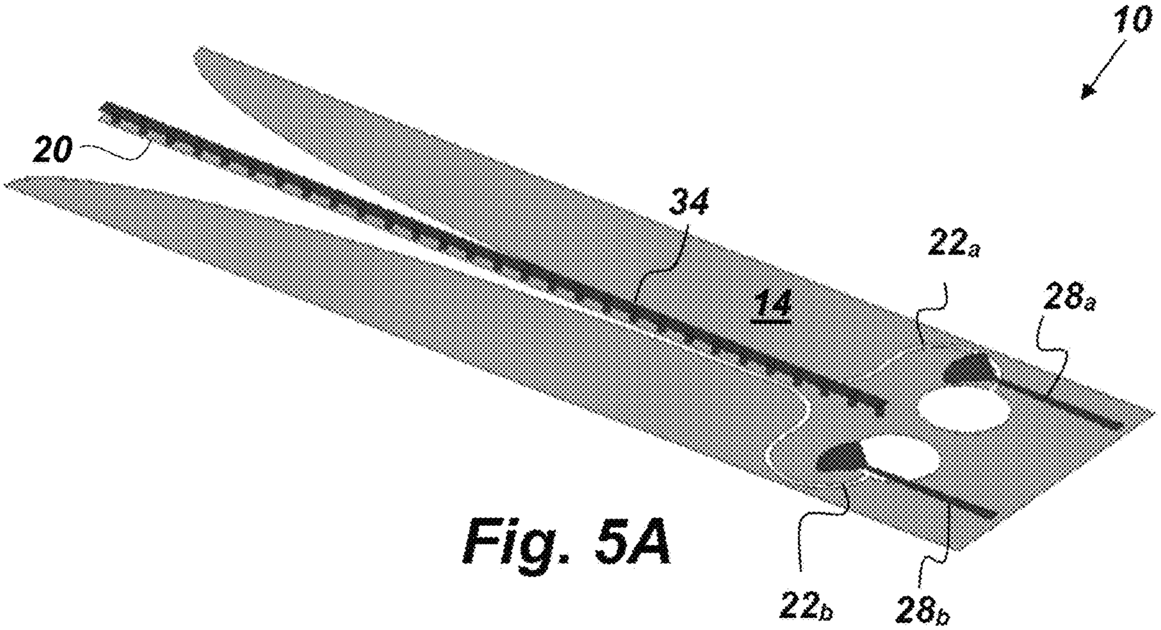
FIG. 5A is a perspective-view illustration of an embodiment of a wideband dual-mode antenna.
Figure 5B:
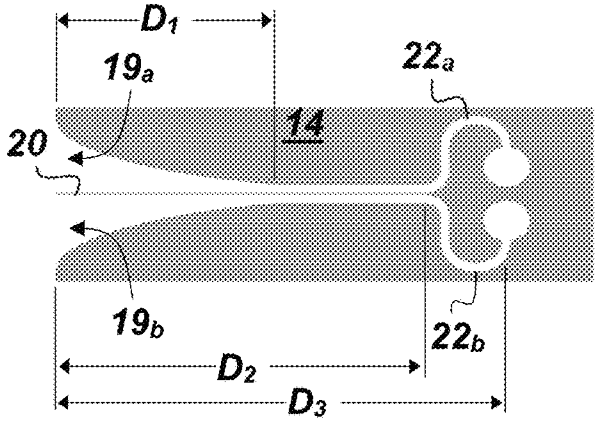
FIG. 5B is a top-view of a conductive layer of the embodiment of the wideband dual-mode antenna of FIG. 5A.
Figure 5C:
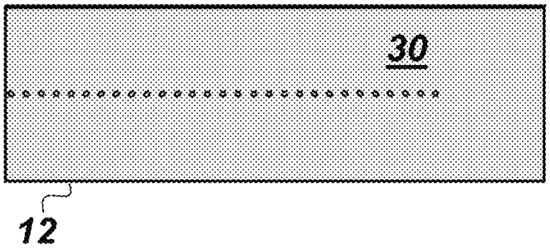
FIG. 5C is a top-view of a dielectric layer of the embodiment of the wideband dual-mode antenna of FIG. 5A.
Figure 5D:
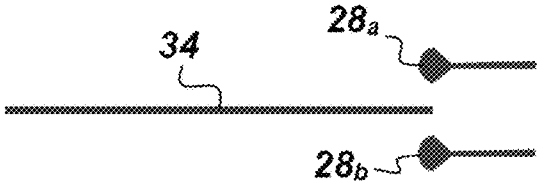
FIG. 5D is a top-view of micro-strip feeds and an isolation boundary of the embodiment of the wideband dual-mode antenna of FIG. 5A.

FIG. 5A is a perspective view of an embodiment of the wideband dual-mode antenna 10 comprising the meandering slot-line paths (22*a* and 22*b*) as well as the isolation boundary 34. FIGS. 5B, 5C, and 5D are respectively top views of the conductive layer 14, the dielectric substrate 12, and the micro-strip conductors or feeds 28*a* and 28*b* corresponding to the embodiment of the wideband dual-mode antenna 10 shown in FIG. 5A. As with FIG. 1A, the dielectric substrate 12 appears as transparent or invisible in FIG. 5 so as to facilitate viewing of the conductive layer 14.

Figure 6:
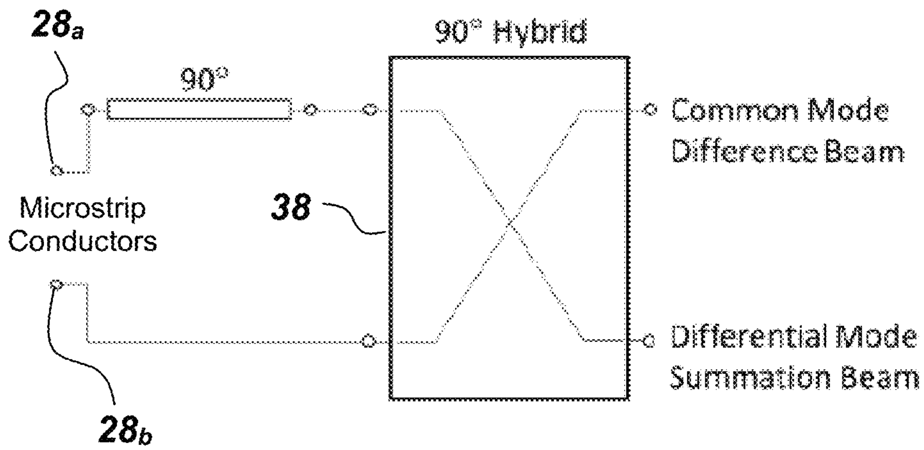
FIG. 6 is a schematic view of a hybrid coupler.

FIG. 6A is a schematic illustration of a 90-degree hybrid coupler 38 connected to the two micro-strip conductors 28*a* and 28*b* such that the corresponding tapered slot antennas generate two orthogonal radiation patterns, such that one of the two tapered slot antennas (e.g., the one fed by micro-strip conductor 28*a*) operates in a common mode and the other tapered slot antenna (e.g., the one fed by micro-strip conductor 28*b*) operates in a differential mode. When the wideband dual-mode antenna 10 is excited in-phase, or in the common mode, since it has two feeds (i.e., micro-strip conductors 28*a* and 28*b*) a difference pattern may be obtained. When the wideband dual-mode antenna 10 is excited out of phase by 180°, or in the differential mode, then a summation pattern may be obtained. One can generate both of these patterns by using a 90° hybrid coupler. The hybrid coupler 38 may be used to generate the sum and difference beams in a similar fashion to how sum and differences beam are generated in a monopulse feed system. However, with the wideband, dual-mode antenna 10, the sum and difference ports are arrayed.

Figure 7A:
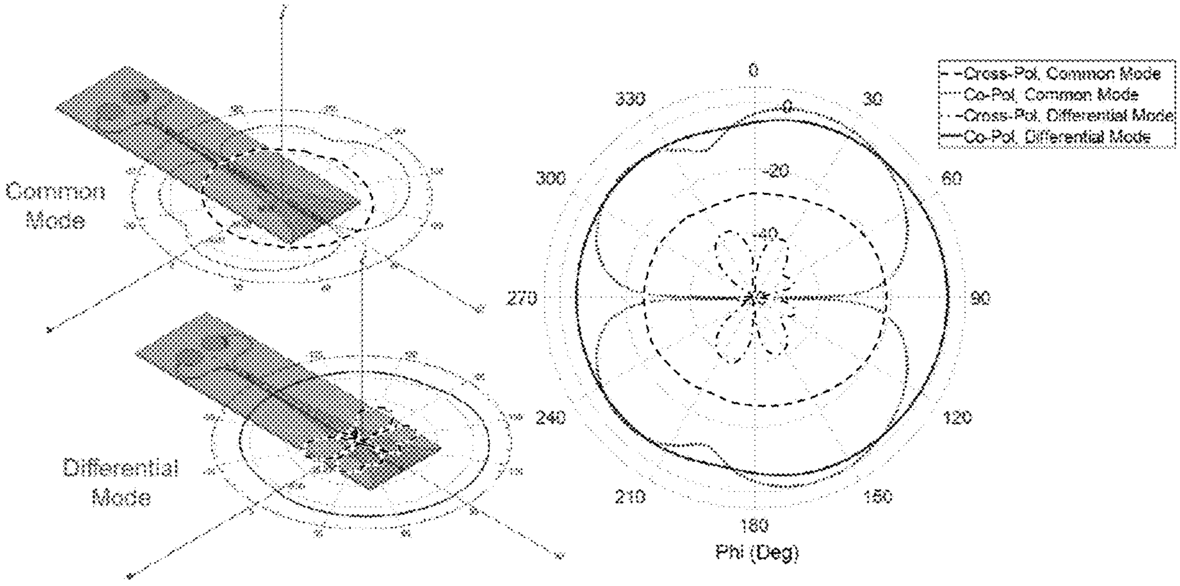
FIG. 7A is an illustration of common mode and differential mode cross-polar and co-polar radiation patterns of an embodiment of the wideband dual-mode antenna at 4 GHz.
Figure 7B:
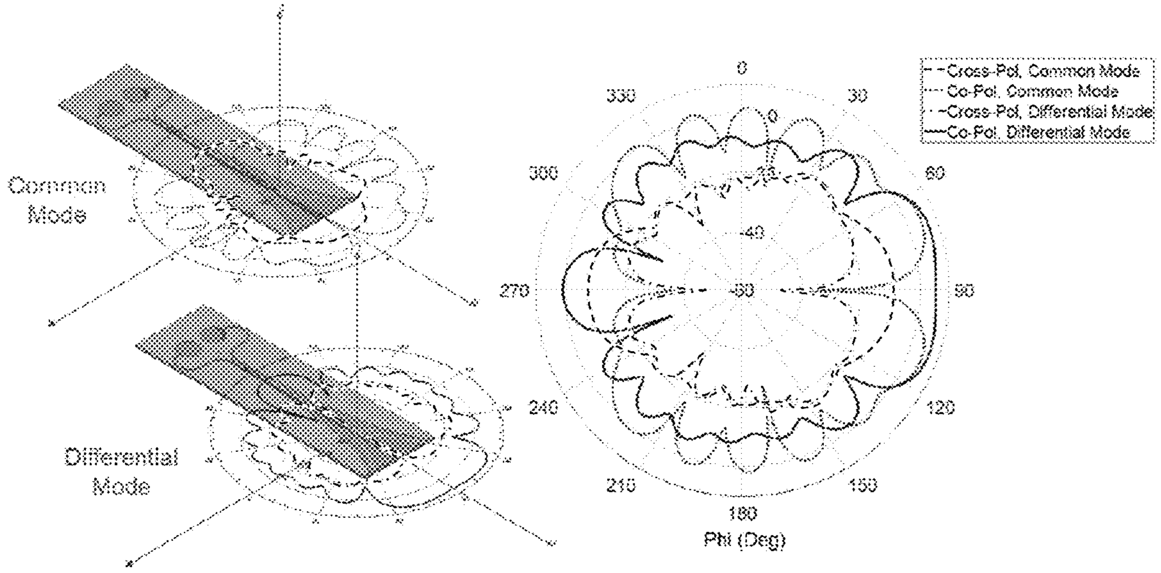
FIG. 7B is an illustration of common mode and differential mode cross-polar and co-polar radiation patterns of an embodiment of the wideband dual-mode antenna at 16 GHz.

FIGS. 7A and 7B are illustrations of common mode and differential mode cross-polar and co-polar radiation patterns at 4 GHz and 16 GHz respectively for the embodiment of the wideband, dual-mode antenna 10 shown in FIGS. 5A-5D. As can be seen, the common mode pattern is destructive with a null at zenith, and the differential mode pattern is constructive with a peak at zenith. These two radiating modes can be combined in a array configuration to reduce and mitigate sidelobes and/or grating lobes.

Figure 8:
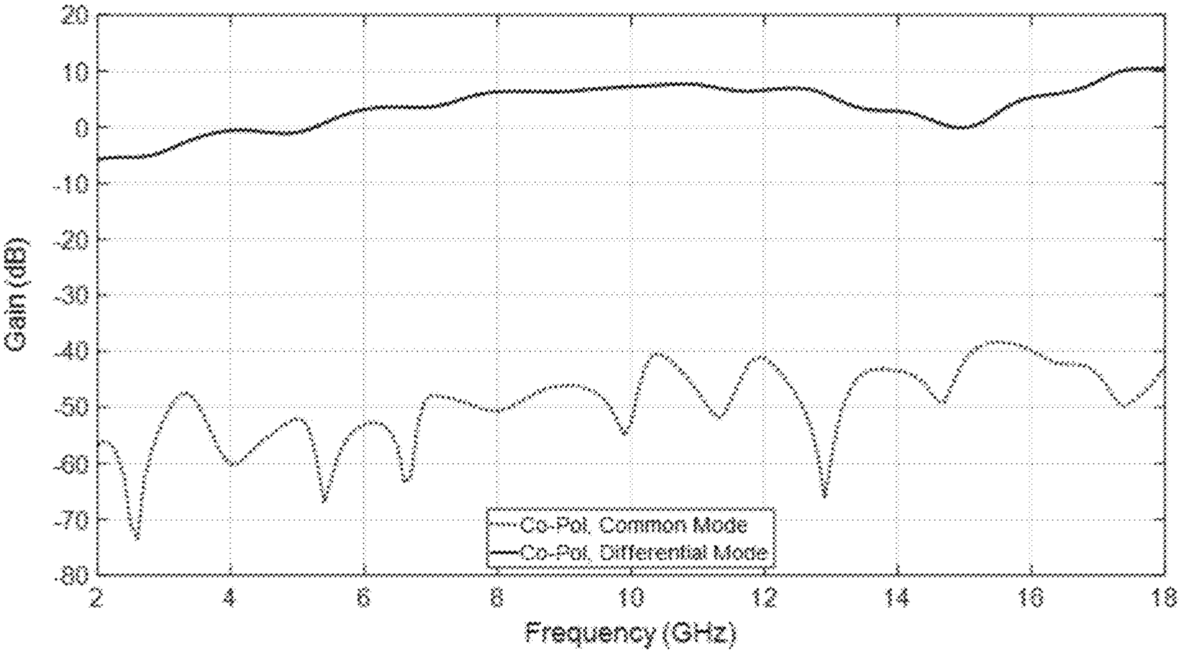
FIG. 8 is a plot of data.
Figure 9:
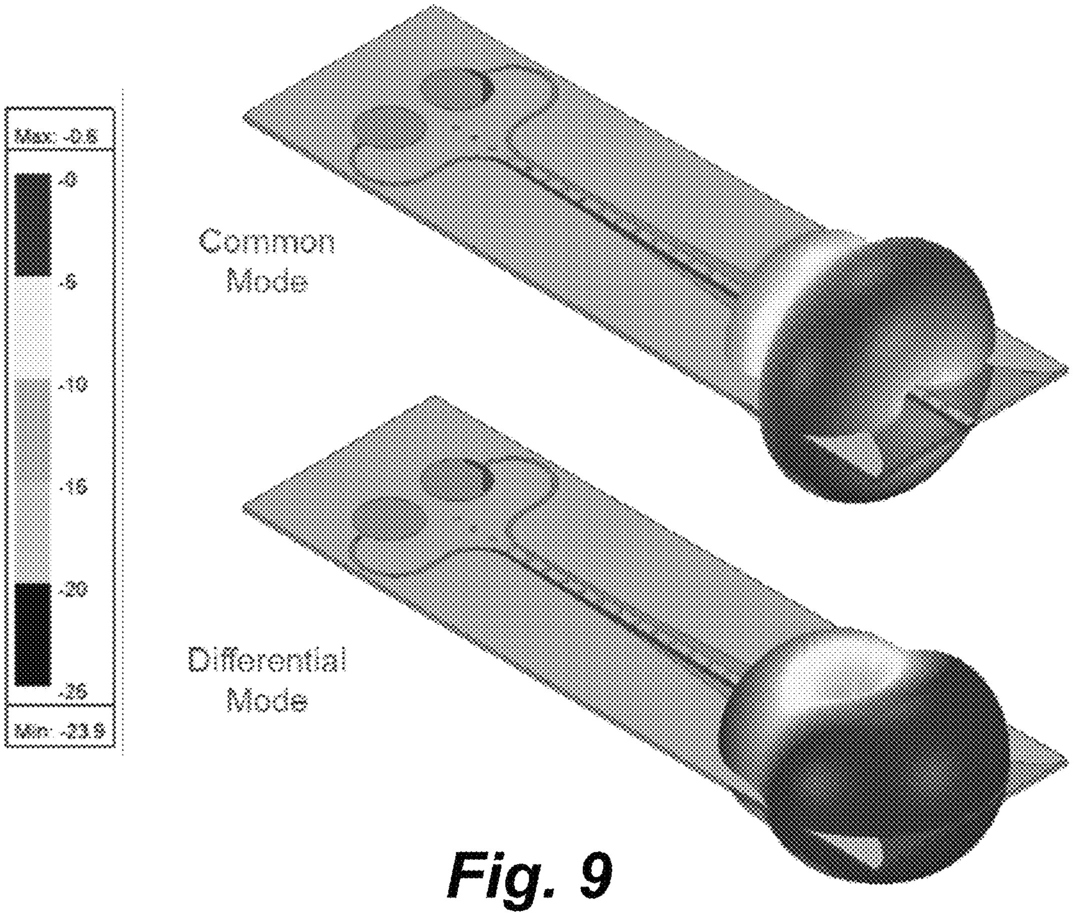
FIG. 9 is an illustration depicting the 3D radiation patterns of common and differential radiating modes for an embodiment of the wideband, dual-mode antenna.

FIG. 8 is a plot of data showing the isolation between the co-polar common mode and the co-polar differential mode across frequency for the embodiment of the wideband, dual-mode antenna 10 shown in FIGS. 5A-5D. As one can see, there is great improvement by adding the isolation vias and by meandering the slotline feed. FIG. 9 is an illustration depicting the 3D radiation patterns of the common radiating mode and the differential radiating mode for the embodiment of the wideband, dual-mode antenna 10 shown in FIGS. 5A-5D From the above description of the wideband, dual-mode antenna 10, it is manifest that various techniques may be used for implementing the concepts of the wideband, dual-mode antenna 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the wideband, dual-mode antenna 10 is not limited to the particular embodiments described herein, but is capable of many embodiments without departing from the scope of the claims.

We claim:

1. A wideband dual-mode antenna comprising:

a dielectric substrate;

a conductive layer disposed on a first face of the dielectric substrate;

two tapered slots formed in the conductive layer so as to define a linear center conductor formed in the conductive layer, wherein the tapered slots narrow to slot-lines having uniform width that are terminated by respective baluns at a feed end of the wideband dual-mode antenna;

two feeds disposed on a second face of the dielectric substrate and configured to feed the two tapered slots at the feed end; and wherein the two slot-lines follow paths that, at the feed end, transition from being parallel to the center conductor to following meandering paths that curve away from, and then back towards, the center conductor, wherein each meandering path includes three 90-degree curves;

a conductive isolation boundary disposed on a second face of the dielectric substrate and electrically connected to the center conductor, wherein the conductive isolation boundary is electrically connected to the center conductor by at least one via in the dielectric substrate; and wherein the conductive isolation boundary has the same width as the center conductor.

2. The wideband dual-mode antenna of claim 1, wherein the conductive isolation boundary is electrically connected to the center conductor by a plurality of evenly-spaced vias in the dielectric substrate.

3. The wideband dual-mode antenna of claim 2, wherein the conductive isolation boundary is made of, and the vias are filled with, a conductive material.

4. A wideband dual-mode antenna comprising:

a dielectric substrate having first and second faces, wherein the first and second faces are opposite to each other;

a conductive layer disposed on the first face;

two tapered slots formed in the conductive layer, wherein each tapered slot tapers from a mouth at an aperture end to a slot-line having a uniform width at a feed end;

a center conductor formed in the conductive layer so as to separate the two tapered slots such that the center conductor defines an edge of each of the two tapered slots;

two micro-strip conductors disposed on the second face so as to feed the two tapered slots to form two tapered slot antennas; and a conductive isolation boundary disposed on the second face opposite, and aligned with, the center conductor and electrically connected to the center conductor through a series of vias in the dielectric substrate, wherein the conductive isolation boundary has the same dimensions as the center conductor such that the conductive isolation boundary does not overlap either of the two tapered slots.

5. The wideband dual-mode antenna of claim 4, wherein the center conductor is aligned with a center line of the wideband dual-mode antenna.

6. The wideband dual-mode antenna of claim 5, wherein the two slot-lines follow paths that, at the feed end, transition from being parallel to the center line to following three 90-degree curves.

7. The wideband dual-mode antenna of claim 6, wherein each of the two slot-lines terminate in a respective circular balun.

8. The wideband dual-mode antenna of claim 5, wherein the slot-lines, at the feed end, transition from paths that are parallel to the center line to meandering paths that curve away from the center line.

9. The wideband dual-mode antenna of claim 8, wherein each meandering path includes three 90-degree curves.

10. The wideband dual-mode antenna of claim 4, further comprising a 90-degree hybrid coupler connected to the microstrip conductors such that the tapered slot antennas generate two orthogonal radiation patterns, such that one of the two tapered slot antennas operates in a common mode and the other tapered slot antenna operates in a differential mode.

11. A wideband dual-mode antenna comprising:

a dielectric substrate having first and second faces, wherein the first and second faces are opposite to each other;

a conductive layer disposed on the first face;

a first slot formed in the conductive layer, wherein the first slot tapers from a first mouth at an aperture end to a first uniform-width slot-line at a first distance from the first;

a second slot formed in the conductive layer so as to define a center conductor in the conductive layer that separates the first and second slots, wherein the center conductor is rectangular from the first and second mouths to the first distance, wherein the second slot tapers from a second mouth at the aperture end to a second uniform-width slot-line at the first distance;

two micro-strip conductors disposed on the second face so as to feed the first and second slots to form first and second tapered slot antennas;

a conductive isolation boundary having the same shape as the center conductor disposed on the second face so as to align with the center conductor, wherein the conductive isolation boundary is electrically connected to the conductive layer through the dielectric substrate; and wherein the first and second uniform-width slot-lines transition from parallel paths between the first distance and a second distance from the first and second mouths to meandering paths that curve away from, and then back towards, each other between the second distance and a third distance from the first and second mouths, wherein the second distance is greater than the first distance and the third distance is greater than the second distance.

12. The wideband dual-mode antenna of claim 11, wherein each meandering path includes three 90-degree curves.

13. The wideband dual-mode antenna of claim 12, wherein each of the two slot-lines terminate in a respective balun.

14. The wideband dual-mode antenna of claim 13, further comprising a 90-degree hybrid coupler connected to the microstrip conductors such that the tapered slot antennas generate two orthogonal radiation patterns, such that one of the two tapered slot antennas operates in a common mode and the other tapered slot antenna operates in a differential mode.

* * * * *